(12) United States Patent
Devarakonda et al.

(10) Patent No.: US 7,269,612 B2
(45) Date of Patent: Sep. 11, 2007

(54) METHOD, SYSTEM, AND PROGRAM FOR A POLICY BASED STORAGE MANAGER

(75) Inventors: Murthy V. Devarakonda, Yorktown Heights, NY (US); Jack P. Gelb, San Jose, CA (US); Avijit Saha, Somers, NY (US); Jimmy Paul Strickland, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/159,494

(22) Filed: May 31, 2002

(65) Prior Publication Data

US 2003/0225801 A1     Dec. 4, 2003

(51) Int. Cl.
*G06F 17/30* (2006.01)
(52) U.S. Cl. ........................ 707/205; 707/200
(58) Field of Classification Search ............. 707/205, 707/200, 204
See application file for complete search history.

(56) References Cited

U.S. PATENT DOCUMENTS

| | | | |
|---|---|---|---|
| 5,018,060 A | 5/1991 | Gelb et al. | |
| 5,136,523 A | 8/1992 | Landers | |
| 5,239,647 A | 8/1993 | Anglin et al. | |
| 5,287,500 A | 2/1994 | Stoppani, Jr. | |
| 5,317,728 A * | 5/1994 | Tevis et al. | 707/204 |
| 5,367,671 A | 11/1994 | Feigenbaum et al. | |
| 5,606,689 A | 2/1997 | Nakagawa | |
| 5,630,127 A | 5/1997 | Moore et al. | |
| 5,872,928 A | 2/1999 | Lewis et al. | |
| 5,978,815 A | 11/1999 | Cabrera et al. | |
| 6,032,161 A | 2/2000 | Fuller | |
| 6,154,817 A | 11/2000 | Mohan et al. | |
| 6,269,382 B1 | 7/2001 | Cabrera et al. | |
| 6,272,598 B1 | 8/2001 | Arlitt et al. | |
| 6,298,173 B1 | 10/2001 | Lopresti | |
| 6,330,621 B1 * | 12/2001 | Bakke et al. | 710/5 |
| 2001/0034812 A1 | 10/2001 | Oshinsky et al. | |

(Continued)

FOREIGN PATENT DOCUMENTS

EP     0950965 A     10/1999

OTHER PUBLICATIONS

J.P.Gelb, System-managed Storage, 1989, IBM Systems Journal vol. 28, No. 1, pp. 77-103.*

(Continued)

*Primary Examiner*—Paul Rodriguez
*Assistant Examiner*—Luke Osborne
(74) *Attorney, Agent, or Firm*—David W. Victor; Konrad Raynes & Victor LLP

(57) ABSTRACT

Provided are data structures for use in storing data. A plurality of data structures are defined in a computer readable medium, wherein each data structure indicates a plurality of attributes and at least one function of a storage resource to store data. Policies are defined in the computer readable medium that associate data characteristics to data structures based on a correspondence of data characteristics and the attributes defined in the data structures, wherein each defined data structure is adapted to provide requirements to determine a storage resource to store associated data, and wherein the defined data structure is adapted to provide the storage resource with requirements for storing the data.

47 Claims, 9 Drawing Sheets

U.S. PATENT DOCUMENTS

2002/0188592 A1    12/2002   Leonhardt et al.

OTHER PUBLICATIONS

U.S. Appl. No. 09/544,625, filed Apr. 6, 2000, entitled "An Efficient Method for Rule-based Distribution and Management of Content in a Distributed Hierarchy of Storage Devices" by R. Chernock, P. Dettori, F.A. Schaffa, and D. Seidman.

Chang, A., R.K. Rader, B.L. Ritter and M.D. Rogers. "Dynamic, Multi-Level Storage Policy for Managing External Page Table Space in the AIX Operating System", IBM Corp., Technical Disclosure Bulletin, vol. 32, No. 5A, Oct. 1989, pp. 270-273.

Lortz, V. and L. Rafalow (eds.). "IPsec Policy Model", Version 0.82, Copyright Distributed Management Task Force, Inc. (DMTF) Nov. 29, 2000, pp. 1-16.

Ellesson, E. (ed.). "CIM Core Policy Model", Copyright Distributed Management Task Force, Inc. (DMTF) May 12, 2000, pp. 1-21.

Chudnow, C. "Policy-Based Storage Management", [online], Copyright Westworld Productions, Inc. 2002, [retrieved on May 31, 2002]. Retrieved from the Internet at <URL: http://www.wwpi.com/archive/ctr_12_01/6910.cfm>.

Leins, R. "Tivoli Storage Manager, A Technical Introduction", Copyright IBM Corp. 2000, May 2001. pp. 1-30.

PCT Search Report dated Dec. 6, 2004 for Application No. PCT/GB 03/02062, filed Dec. 5, 2003.

PCT Preliminary Examination Report dated Oct. 28, 2005 for Application No. PCT/GB 03/02062, filed Dec. 5, 2003.

* cited by examiner

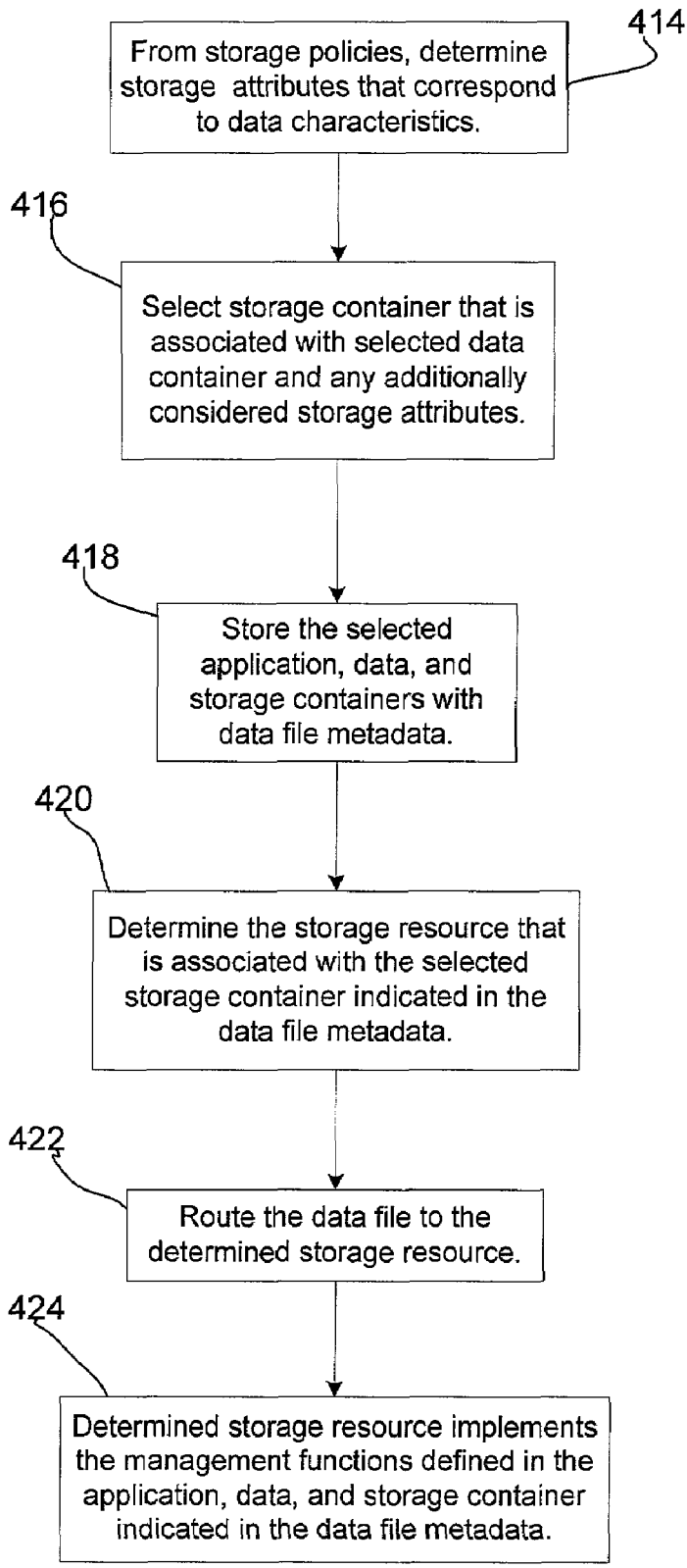
FIG. 6b  Storage System Policy Manager

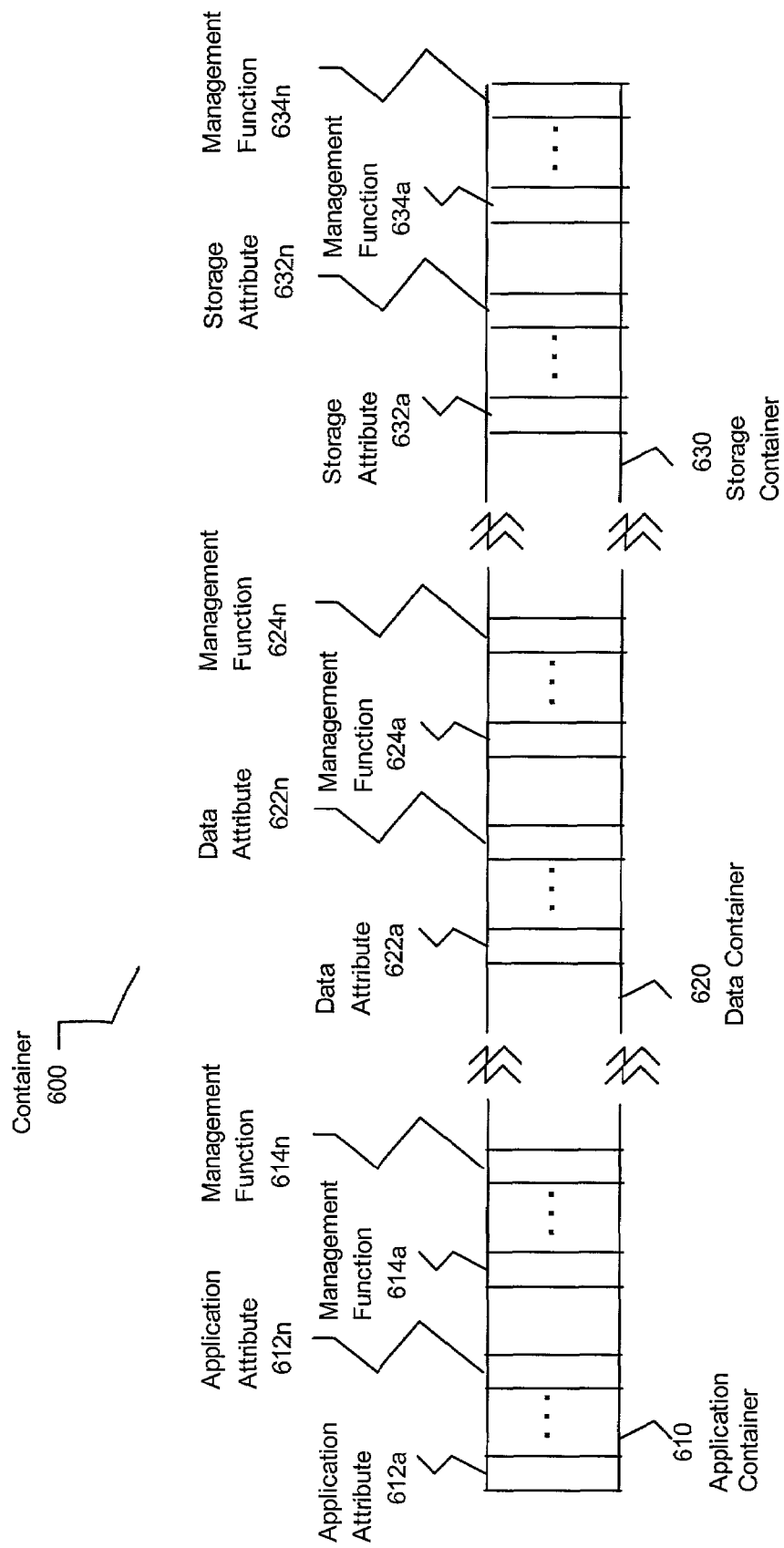

METHOD, SYSTEM, AND PROGRAM FOR A POLICY BASED STORAGE MANAGER

BACKGROUND OF THE INVENTION

1. Field of the Invention

The present invention relates to a method, system, and program for a policy based storage manager.

2. Description of the Related Art

A policy based storage management framework specifies how data having certain characteristics is associated with different pools of storage space that will store such data, as well as how the data will be managed throughout its lifecycle. One prior art policy based storage management framework, described in the commonly assigned U.S. Pat. No. 5,018,060, which patent is incorporated herein by reference in its entirety, describes a policy based storage management framework that provides constructs including data classes, storage classes, and management classes that are used to select storage devices for a data file or data set based on the characteristics of the data file. A data class specifies data file logical attributes, such as data file type, record length, logical data storage space requirements, expiration and retention dates for the data, etc. A storage class defines a set of storage services, such as random access specifications, sequential access specifications, guaranteed space, etc. A management class specifies availability and retention management requirements for data, such as hierarchical storage management (HSM), expiration, backup frequency, retention of backup copies, etc.

An automatic class selection (ACS) routine receives a request to create or access a data file and then selects and assigns data, storage, and management classes that apply to the data file based on characteristics of the data file, e.g., application that generated data file, file name, date, owner of file and/or application, etc. The final selection is of a storage group based on the data, storage, and management classes assigned to the data. The storage group provides the allocation of physical storage space for the data file. With the described prior art policy based storage management framework, data files can be members of one data class, but be assigned to different storage and/or management classes, which determine to which storage group the data file is assigned.

The above described policy based storage management framework was primarily intended for systems in which a storage subsystem, such as a Direct Access Storage Device (DASD) is directly attached to a storage controller, that assigns hosts data to particular storage groups in the manner described above.

Notwithstanding, there is a need in the art for additional policy based storage management frameworks that may be used with both directly attached storage and indirectly attached storage, such as in a storage networking environment.

SUMMARY OF THE PREFERRED EMBODIMENTS

Provided are a method and data structures for generating data structures for use in storing data. A plurality of data structures are defined in a computer readable medium, wherein each data structure indicates a plurality of attributes and at least one function of a storage resource to store data. Policies are defined in the computer readable medium that associate data characteristics to data structures based on a correspondence of data characteristics and the attributes defined in the data structures, wherein each defined data structure is adapted to provide requirements to determine a storage resource to store associated data, and wherein the defined data structure is adapted to provide the storage resource with requirements for storing the data.

Provided are a method and article of manufacture for processing data to be stored. An application attribute is associated with data based on an application policy. A determination is made of an application attribute value in a predetermined data structure, wherein the data structure is adapted to be received by a data level element and by a storage resource and to provide the storage resource with requirements for storing the data.

Provided are a method, system, and article of manufacture for storing data. A determination is made of characteristics of the data. A plurality of data structures are processed. Each data structure may indicate a plurality of attributes and at least one function, to determine one data structure having attributes corresponding to the determined characteristics of the data. A storage resource is associated with the determined data structure and the storage resource associated with the determined data structure implements the attributes and functions indicated in the data structure.

The described implementations provide techniques for implementing a policy based management framework for associating data with storage resources.

BRIEF DESCRIPTION OF THE DRAWINGS

Referring now to the drawings in which like reference numbers represent corresponding parts throughout:

FIGS. 6*a* and 6*b* illustrates logic to select a storage resource for a data file using the policy based storage manager framework in accordance with certain implementations of the invention;

FIG. 7 illustrates a container data structure in accordance with certain implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Policy Based Management Framework

Described implementations concern a comprehensive management platform for an environment that includes a variety of mission critical applications, large numbers of servers running different operating systems, storage systems with differing capabilities, and many network elements that interconnect servers with storage systems. Storage management deals with many levels or layers of the system: i.e. disk (storage) level, data level, and application level. Storage management is also multi-faceted: e.g. performance, recoverability, capacity planning, security, and installation aspects and handles transient as well as persistent aspects: e.g. I/O requests (transient) and data (persistent). The described implementations may present and utilize the following concepts: multi-level, inter-related policies, based on the layers of the storage environment, and mechanisms to establish these relationships; a container concept that allows defining an arbitrary set of storage, management, and/or service classes as per the needs of a management solution and/or installation; a tighter integration between resource manager and policy manager, allowing for a dynamic behavior; a connector concept to provide a standard characterization of managed elements and to provide a semantic mapping from the standard characterization to the actual. The described implementations allow the integration of business objectives, specifying resource usage, availability, recoverability priorities; system model, specifying what changes should be noticed and how; metrics specifying what and how to measure the system, and when to raise "alarms"; and service contract, specifying the monitorable interactions with other components (e.g. application) of the information infrastructure.

A policy is a "condition-action tuple." The condition part specifies an event or state that acts as trigger(s) for the action part to be executed. The condition can reflect a timer-based value (e.g. midnight, Thursday, "first day of a new quarter"), an internal or external situation (e.g. error code raised/exception thrown, job successfully terminates), or an attribute value (e.g. service level, size, application name). The action(s) associated with the occurrence of one or more conditions may involve the execution of specific procedures or functions, the raising of other conditions, and/or the setting of other attributes to particular values. In this last case, an action may thus establish triggers for other actions.

Figure 1:
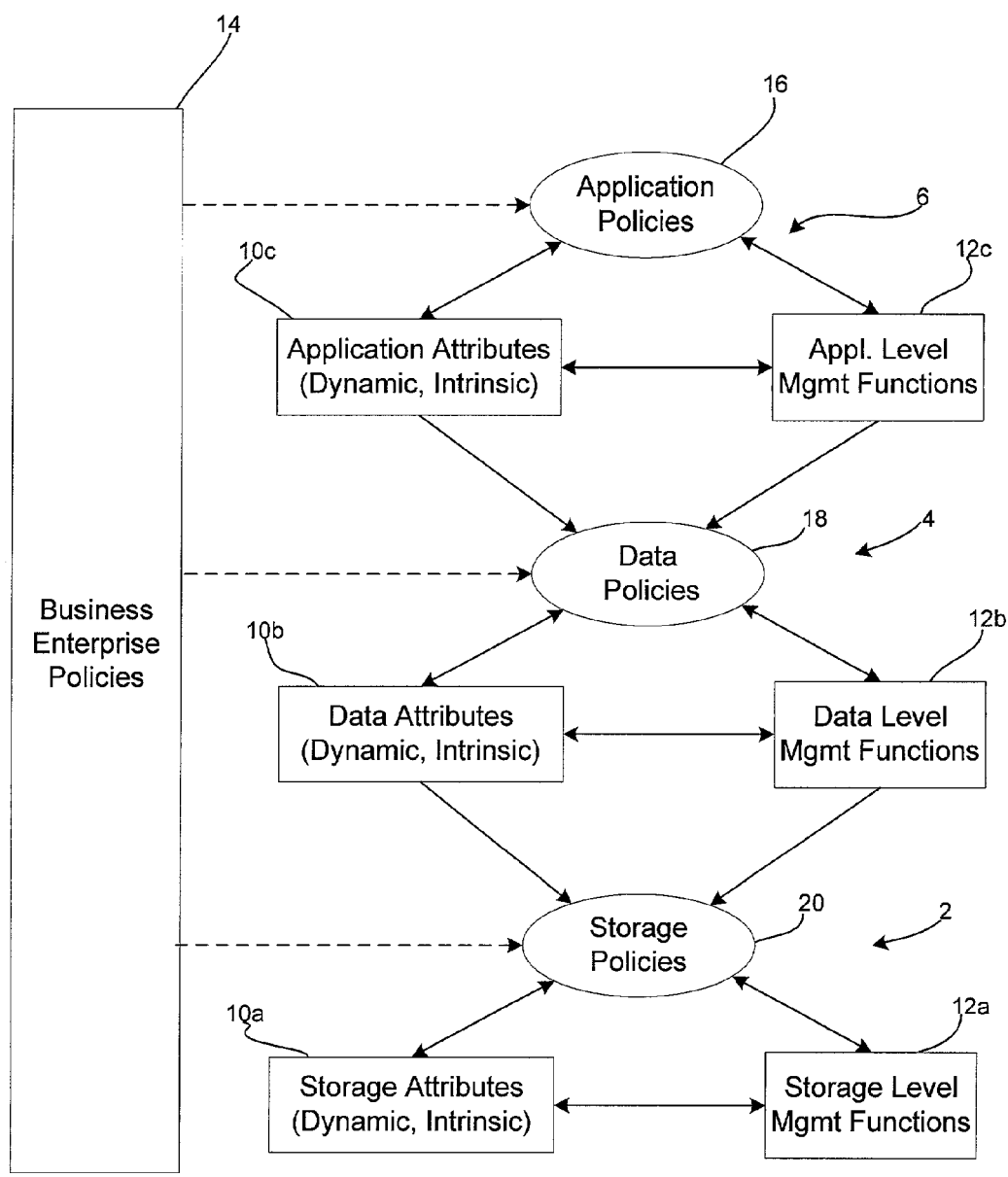
FIG. 1 a view of policy based storage management architecture in accordance with certain implementations of the invention.

FIG. 1 illustrates a conceptual view of how policy based management can be applied to the storage area. In FIG. 1, the system has three layers—storage 2, data 4, and the application 6. The storage level 2 relates to physical aspects of a storage system that deals with "storing and retrieving" of raw bits, the data level 4 relates to logical aspects of a storage system, such as providing data access methods, and the application level 6 relates to users of the storage system, such as middleware, applications, and business processes, and their requirements on data and storage supported at an aggregate level.

Each policy level 2, 4, and 6 allows policies to be defined for that level. Policies at any given level are defined in terms of attributes 10a, 10b, 10c and management functions 12a, 12b, 12c. Attributes 10a, 10b, 10c represent properties and characteristics of the managed environment (e.g. capacity of a disk, throughput rates needed for an application, most recent modification time on a file). They are further distinguished as intrinsic (static) and dynamic (time-varying). Intrinsic attributes do not change with time and hence they can be referenced but not reset. Dynamic attributes can be referenced and can be reset. Management functions 12a, 12b, 12c are the basic mechanisms that perform the administration of the environment (e.g. creating a logical disk, mounting a file system, quiescing an application). Management functions 12a, 12b, 12c may be invoked as the action part of a policy execution. Both policies 10a, 10b, 10c and management functions 12a, 12b, 12c may use intrinsic attributes and may reset dynamic attributes. In certain implementations, each higher-level policy can influence the next lower level policies through the attributes and management functions. Attributes at a higher level can be used in the next lower level policies, and management functions at a higher level may activate policies at the next lower level.

FIG. 1 further shows how business/enterprise policies 14, such as Service Level Agreements (SLAs) and service level objectives (SLOs), as well as government regulations affect the levels 2, 4, 6 and are translated either automatically or manually into policies at the three levels described here.

Application policies 16 may be used to control the manner in which a particular task accesses or consumes computational resources, or to prioritize that task relative to others. Application policies 16 concern an application's requirements on the data that it generates or uses—and, indirectly, the storage on which that data resides. For instance, an application may have specific requirements for the speed and format of data access, or for recoverability of the data in the event of an outage. The speed of access may be a consequence of needing to achieve a certain transaction rate, and may potentially vary during application execution. Hence, different applications may require different access rates when accessing the same file, or may require different types of I/O (e.g. read vs. write, sequential vs. random). Additionally, synchronizing the backup of modified files may vary across applications; this is particularly significant if different applications have diverse synchronization requirements and have a file in common.

To implement the application policies 16, application attributes 10c are associated with the file when an application is accessing that file. The application attributes 10c may include initial access delay, sustained access rate, I/O rate, I/O bandwidth, read/write ratio, sequential/direct access, aggregate backup/recovery criteria (e.g. outage time, currency). Application attributes 10c may be collected into named sets of service classes. The association of such a set with an application's use of a file is one instance of an application policy 16. For instance, the service criteria may be used to determine whether data can be moved up and down the storage hierarchy.

Data policies 18 are concerned with the data itself rather than any particular application's use of the data. These include criteria for the management of the data's life cycle, recoverability, and security. As with application policies, data policies may be based on data attributes 10b. Data attributes 10b include life cycle attributes and recoverability attributes. Life cycle attributes specify the length of time the data needs to be kept and the number of versions of the data that must be maintained. Life cycle policies prescribe what actions should (or must) be taken when the time period has elapsed or the number of versions is exceeded. Recoverability attributes indicate the number (and potentially the geographic location) of backup copies of the data, and the cyclic nature of the backups. Recoverability attributes are used to trigger a backup action, delete older backup copies, or restore data from a backup copy. Data attributes 10b also include security attributes that define logical and physical security policies. Logical security is concerned with access lists (i.e. 'who' can access the data) and authorization levels (i.e. and do 'what' with it). Security attributes allow or deny access based on the requester's authorizations. Physical security relates to the placement of data on physically secure devices (e.g. in a locked room).

Storage policies 20 govern the partitioning and use of storage space, the topology of storage within an enterprise, and the management of the storage components themselves. Storage attributes 10a may provide requirements on the storage device, or the storage systems (i.e. a number of storage devices packaged as a system). Storage policies 20 may concern the management of the individual storage devices are primarily vendor-dependent. Examples of these are the use of dynamic RAID reconfiguration capability, specific 'snapshot' implementations, dynamic defragmentation/garbage collection, on-board cache management, performance-based capacity control, etc. Storage attributes 10a that are device related include capacity, bandwidth, I/O rates, sequential/direct, reliability/error rates, concurrent copy capability, physical location, security, lease duration, cost, etc. The actions or management functions 12a associated with the storage policies 20 include enabling/disabling usage, draining, dumping, initiating transfers (e.g. for copy purposes), hierarchy management, etc.

The above described policies 16, 18, and 20 are designed for the management of storage (and data residing on the storage) and are intended to satisfy business objectives. These policies 16, 18, 20 may be explicitly stated, or implied by/derived from other policies that reflect business practices and guidelines (i.e. business policies). Thus, the application 16, data 18, and storage policies 20 may be derived from the business policies. Examples of business policies include: financial transaction data must be kept for a certain period of time, employees must be paid at a certain day and time each month, up-to-the-minute copies of all financial records are to be stored in an off-site vault, etc.

The first business policy implies a data policy that any data file containing financial transactions must have a minimum retention characteristic of a number of years from the last update. The second business policy implies an application policy determining when the payroll application must be run. The third business policy implies a data policy for the remote copying of specific data.

Storage management may involve the following areas: performance, which involves service delivery rates, hot spots, latency, resources utilization, etc.; availability, which includes data protection as well as fault tolerance aspects; security, which involves access control, authentication, audit trails, physical security, etc.; space and capacity, which involves the amount of storage space, I/O bandwidth, size limits, etc.; and installation and physical entities, which include leases, housing issues, etc.

Figure 2:
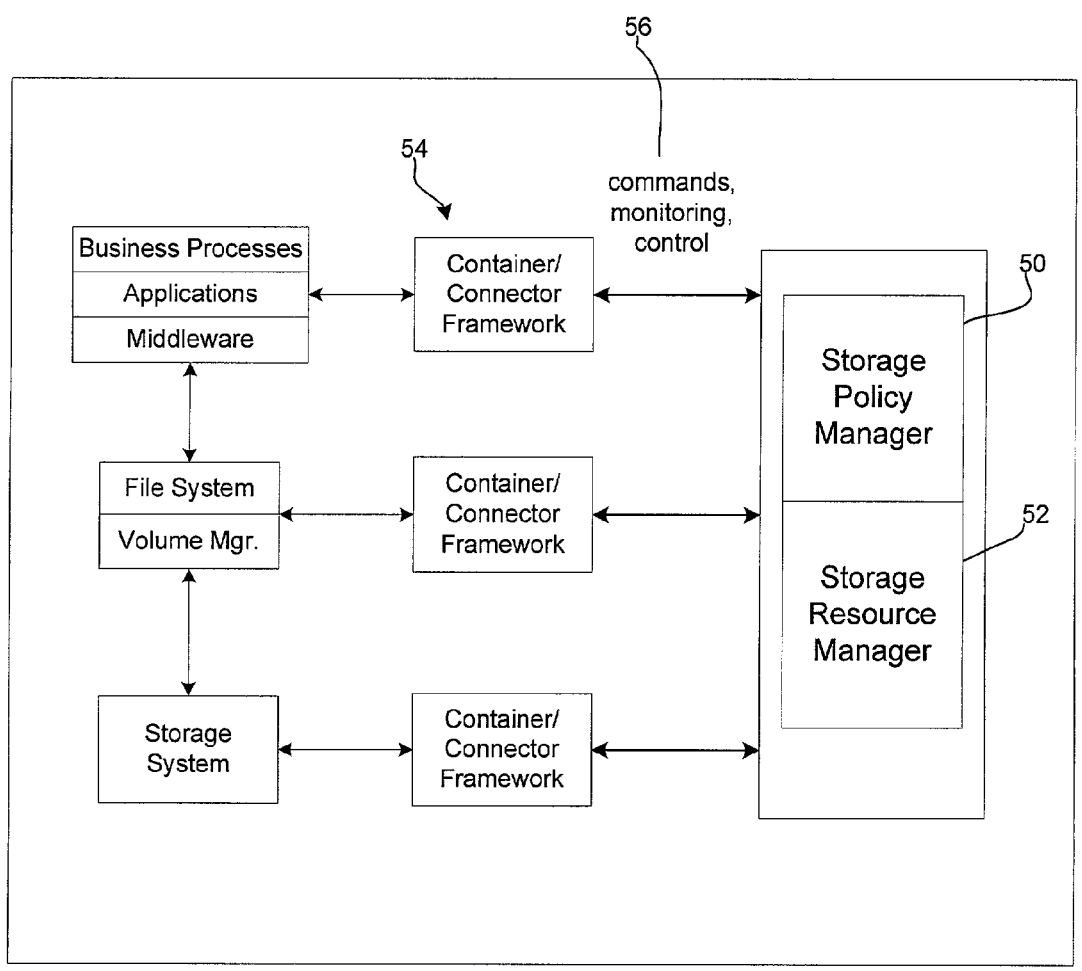
FIG. 2 illustrates a further view of a policy based storage management architecture in accordance with certain implementations of the invention.

FIG. 2 illustrates an embodiment of the policy based storage management architecture which includes three elements, a storage policy manager 50, storage resource manager 52, and a connector framework 54. As FIG. 2 shows, the storage policy manager 50 and storage resource manager 52 work with the environment using the connector framework 54. The commands, controls, measurement, events, and feedback 56 flow through the connector framework 54 between the environment and the management infrastructure. In the scenarios where the environment consists of a policy-based tool or a component, the connector framework 54 may provide the mechanisms to influence policies of that tool/component.

Figure 3:
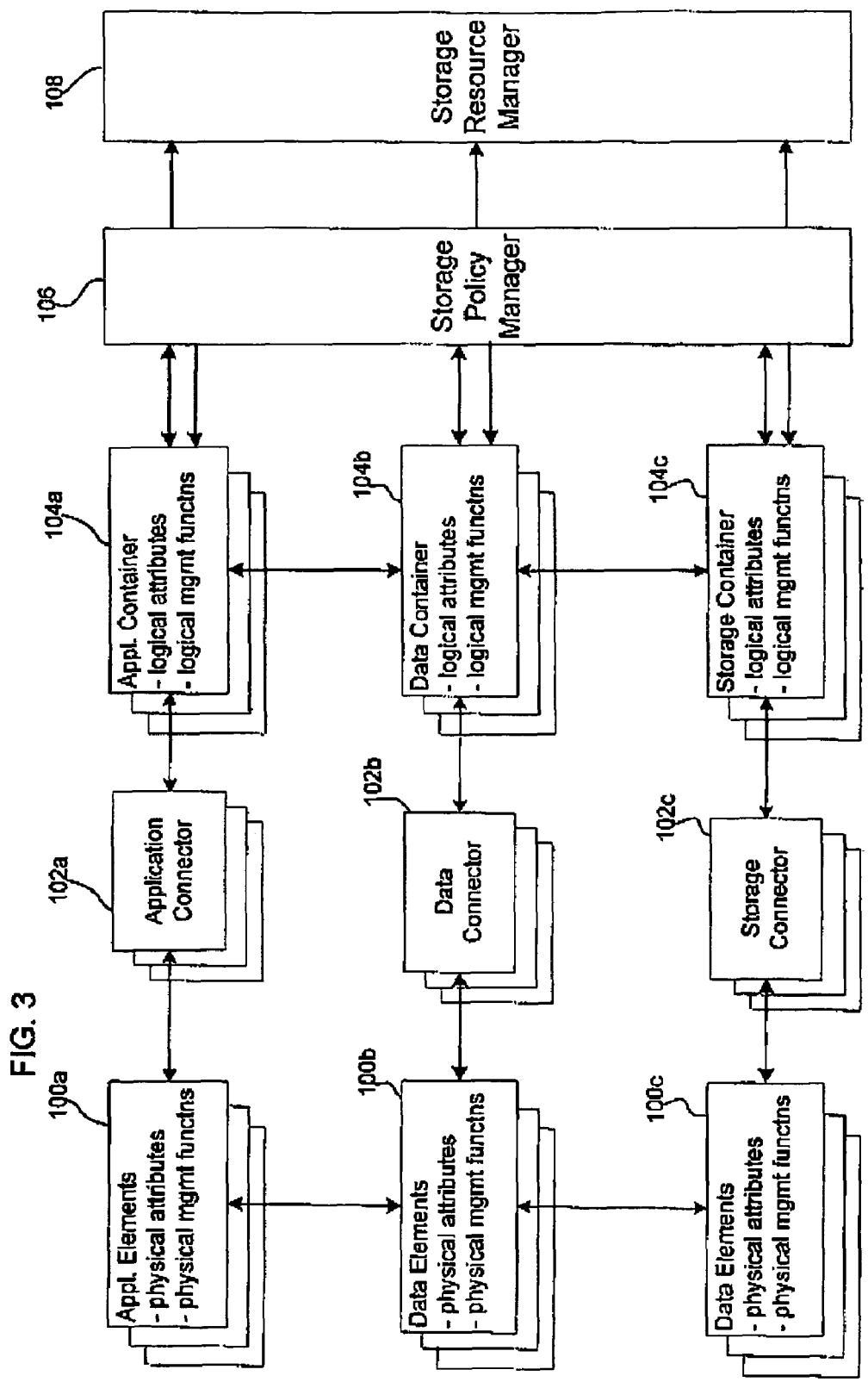
FIG. 3 illustrates a still further view of a policy based storage management architecture in accordance with certain implementations of the invention.

FIG. 3 is a detailed view of the policy based storage management framework. FIG. 3 containers are abstract constructs and, in certain implementations, may be implemented as object oriented classes having certain associated properties and functions. Elements added to a container may inherit functions and properties provided by the container. Thus, making an element a member of a container makes the functions and properties included in that container available to that element. A container is a collection of logical attributes and associated functions. For example, a storage container may comprise a collection of logical storage attributes and management functions. Several physical storage elements may be used to support a storage container abstraction and hence the logical attributes of the container represent the physical attributes of the elements in an individualized as well as in an aggregate form. The attributes may refer to such aspects as reliability, performance, availability, and installability aspects of the elements. A specific container definition consists of a subset of the logical attributes. All elements supporting the container definition offer homogeneous attribute values. In embodiments where containers are implemented as an object oriented class, a container can be defined using a class definition in object oriented programming. The number of distinct container classes depends on the number of logical attributes at a given level.

The container maps a specific combination of logical attributes to a set of specific data and storage elements that can be used to support service implied by the attributes. An element may comprise any hardware or software product or component that provides some form of data or storage placement, access, or management function depending on the context. A container defines requirements for a number of data/storage software and hardware elements or parts/products that actually house and manage the application in a manner that meets the service requirements. Also, the same level of service defined by attributes and management functions included in a container may be implemented by different sets of elements or parts/products. For example, storage controllers provided by different vendors may satisfy the same level of service specified in a container. This allows data and storage used by a single business application to be placed, based on container policy, in more than one vendor's controllers (multiple containers) while managing all of the application's data/storage through a single instance of an application policy.

Management functions define data/storage hardware or software functions implemented by a container. The management functions defined by a container may map to element functions provided by a vendor that supplies the underlying elements or third party software that sits between the element and the connector layer.

The connectors 102a, 102b, 102c comprise a software methodology for bringing together two pieces of software that were not designed or coded to interface with one another. For instance, the connectors 102a, 102b, 102c may bridge the storage policy manager 106 that provides a set of policies for specifying data and storage QoS (Qualities of Service) from a top-down business application perspective and the storage management products and components.

FIG. 3 illustrates further details of the relationship of elements 100a, 100b, 100c, connectors 102a, 102b, and 102c and containers 104a, 104b, 104c. A connector 102a, 102b, 102c is a means of bridging across two different software components, each with its own interfaces and semantics. A connector may have a policy level and a management level. A policy level represents software that accepts or supports the policy interfaces. The policy level supports policy definition for data and storage management specified from the top or business application perspective. The policy level software provides a single interface and may represent policy specification in the form of XML documents to the management level connectors.

A management level represents the software that supports or invokes the specific management functions interface of a specific software or hardware product or component. The management level in conjunction with the software and hardware defined for the container actually provides the management of the data and storage resources. The desired policy based management of the data and storage resources is achieved by connecting together the policy and management levels. The management level implement functions that satisfy the attributes specified in the policy level. A vendor may supply management level components to integrate their products into the environment. The management level connector software uses the interface to invoke the functions.

A specific container instance (list of elements within the container) may be created for each unique combination of elements a customer wants to deploy in the storage environment. A management level connector is constructed and deployed to connect each set of unique management functions to the policy level software.

The storage policy manager (SPM), shown as element 50 in FIGS. 2 and 106 in FIG. 3 provides a policy related infrastructure. The SPM includes a policy administration component, a policy engine, and a meta-information repository. The SPM may include components such as a policy specification tool, a policy decision point, a policy enforcement point, and a policy repository. The policy administration component provides the policy specification function of the reference architecture and the vocabulary for expressing policies. The policy administration further provides the transformation logic to translate policies specified in terms of business objectives (e.g. SLAs and SLOs) to policies at the storage, data, and application levels as shown in FIG. 1. The policy administration component also provides analysis functions for validating syntactic and semantic aspects of policies. The policy administration component may further identify and resolve conflicts between different policy groups.

The SPM 50, 106 may further include a policy engine component that implements the policy decision point and portions of the policy enforcement point. Some policies decision points may be driven by events including a timer-pop (e.g. midnight, Thursday, "first day of a new quarter"), occurrence of an internal or external state change (e.g. error code raised/exception thrown, job successfully terminates), change in an attribute value (e.g. service level, size, application name), request for a new service start up, or even an arrival of a specific service request in the data path. A repository of policies may specify a response to an event. Once a relevant policy is determined for an event, then the action specified by the determined policy is implemented. The policy engine drives the policy enforcement by invoking management functions provided by the containers in response to events. The policy engine might also reset certain attribute values as a result. In this way, containers also participate in policy enforcement.

The SPM 50, 106 may further include a meta-information repository that stores various pieces of information needed for the policy infrastructure. This includes policies represented in some internal form. The repository may also store information on data assets of (i.e. files and/or logical volumes used by) an application.

The storage resource manager (SRM), shown as elements 52 (FIG. 2) and 108 (FIG. 3) complements the policy manager in providing storage management automation. The SRM 52, 108 provides analysis and resource deployment recommendations for managing storage resources on a long term as well as short-term basis. Some of the functions expected of SRM in this architecture may already be available (or will be available) in existing storage system elements, and the other functions may have to be implemented as a new component. SRM 52, 108 activities may include resource planning for "normal" and "change in configuration" situations; differentiated service support; problem identification, analysis, and resolution; and overload monitoring and management.

The SRM 52, 108 further handles changes to the storage system, which may result from new subsystems being added or as a result of some subsystems failing. The SRM 52, 108 may determine a re-allocation of storage to data to meet committed service objectives. The SRM 52, 108 may identify any changes to the service objects that may be needed as a result of the system changes as port of static resource management.

In certain implementations, the SPM 50, 106 provides an automated way of classifying or prioritizing the workload based on business objectives, whereas the SRM 52, 108 implements a class-based service, giving preferential treatment to some classes even at the cost of the other classes when resources are constrained. This requires existence of service classes and the resource provider's ability to service requests for different classes.

Implementation of a Policy Based Management Framework

Figure 4:
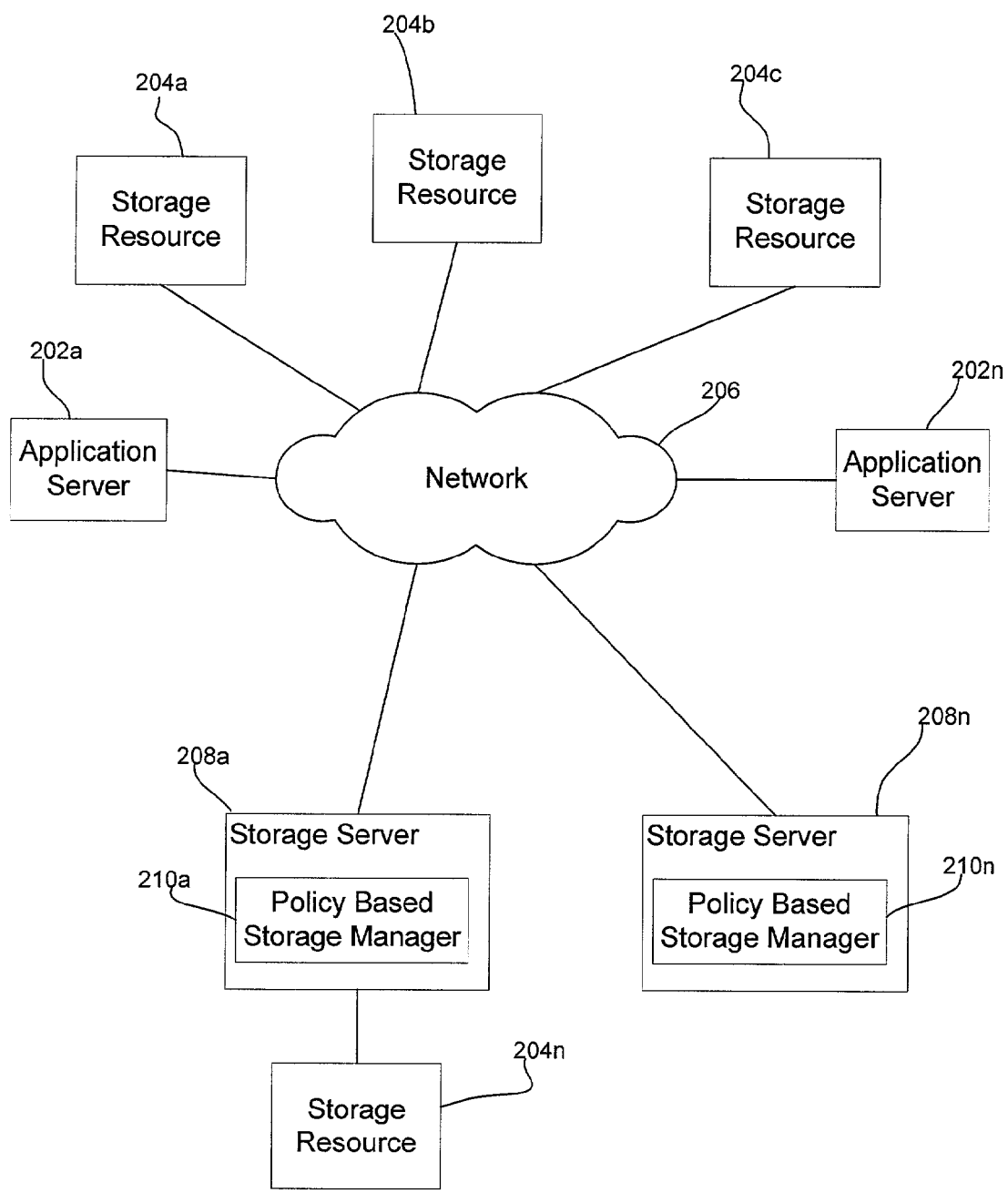
FIG. 4 illustrates a network computing environment in which aspects of the invention are implemented in accordance with certain implementations of the invention.

FIG. 4 illustrates a network computing environment in which aspects of the invention are implemented. A plurality of application servers 202a . . . 202n may transmit data to network storage resources 204a, 204b . . . 204n over a network 206. Storage servers 208a . . . 208n include policy based storage manager programs 210a . . . 210n to route the data files, created by application server 202a . . . . 202n applications (such as database applications or any other data processing application known in the art) to network storage resources 204a, 204b . . . 204n based on the characteristics of the data files. FIG. 4 shows that storage resources, such as 204n, may be directly attached to a storage server 208a. The application servers 202a . . . 202n may comprise any computational device known in the art (e.g., a workstation, personal computer, mainframe, server, laptop, hand held computer, telephony device, network appliance, etc.). The storage resources 204a, 204b . . . 204n may comprise any storage device, storage system or storage subsystem known in the art that directly connects to the network 206 or is attached to another device, such as the case with storage resource 204n attached to storage server 208a. The storage resources 204a, 204b . . . 204n may comprise a Just a Bunch of Disks (JBOD), Redundant Array of Independent Disk (RAID), Network Attached Storage (NAS), a virtualization device, tape library, optical disk library, etc. The network 206 may comprise any network system known in the art, such as a Local Area Network (LAN), Storage Area Network (SAN), Intranet, Wide Area Network (WAN), the Internet, etc. The storage servers 208a . . . 208n may comprise any device capable of managing application access to a storage resource, such as any server class machine, a storage controller, enterprise server, etc.

The policy based storage manager 210a . . . 210n receives requests to create data files from the application servers 202a . . . 202n and based on the policy based framework described herein determines a group of storage resources 204a, 204b . . . 204n that may be selected to store the data files. The policy based storage manager may implement the schema shown in FIG. 3, where each of the components 100a, 100b, 100c, 102a, 102b, 102c, 104a, 104b, 104c, 106, and 108 may be implemented as one or more program components that execute on one or more machines. For instance, the program components of the policy based storage manager 210a . . . 210n may be entirely implemented on a storage server 208a . . . 208n, or the program components may be implemented in a distributed computing environment on multiple types of computing devices running the same or different operating systems and that communicate and interact over the network 206.

Figure 5:
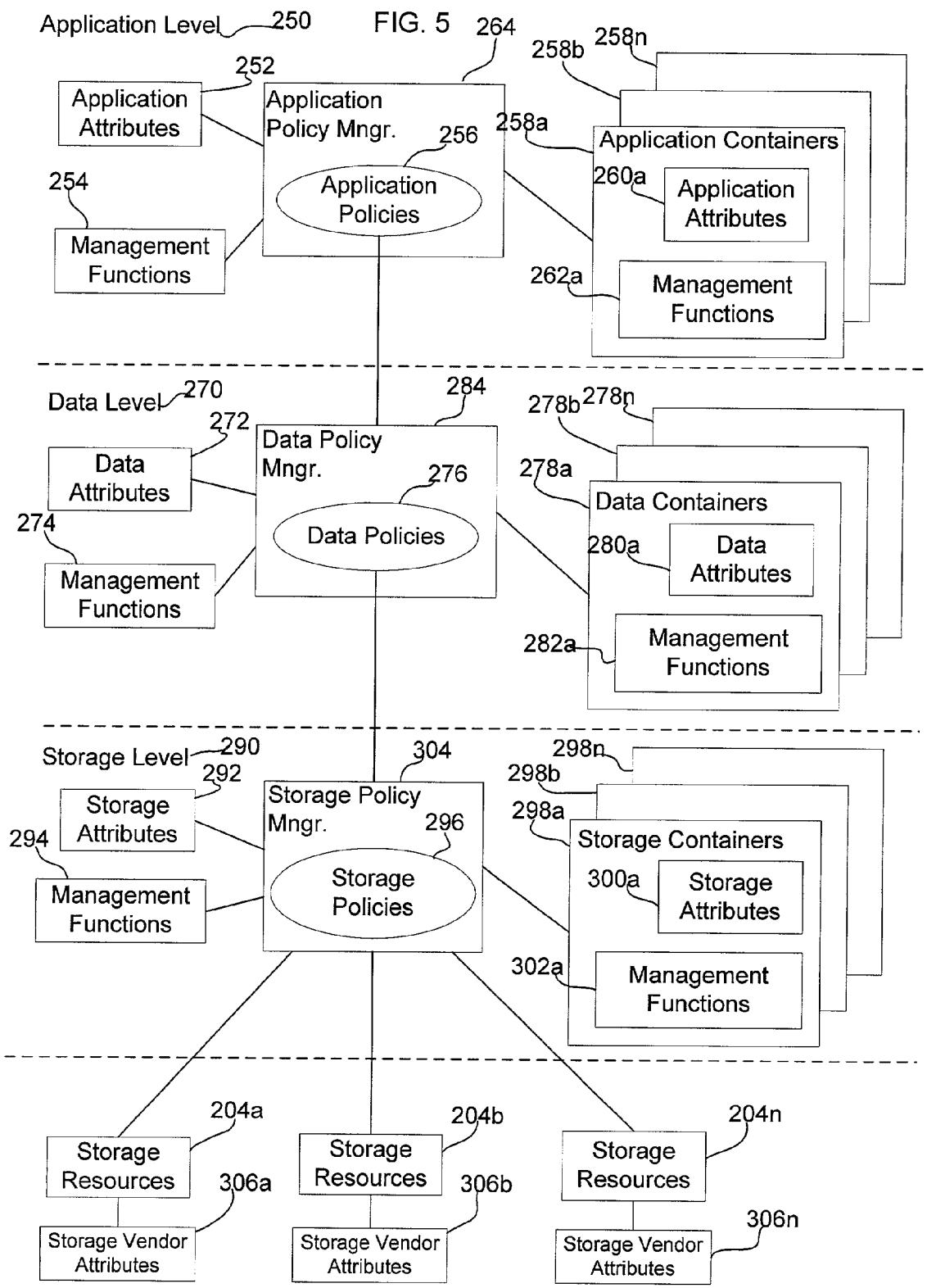
FIG. 5 illustrates a policy based storage manager framework in accordance with certain implementations of the invention.

FIG. 5 illustrates an alternative policy based manager schema to the schema shown in FIG. 3, that may be implemented in the policy based storage manager 210a . . . 210n (FIG. 4) to assign data files to storage resources 204a, 204b . . . 204n. The schema of FIG. 5 is defined as having three levels, an application level 250, data level 270, and storage level 290. The application level 250 specifies business objectives and goals to relate to the storage resource management. Service level agreement objects may be specified at the application level 250, such as the quality or quantity of the overall service. The data level 270 represents the application requirements of the data and how the application will utilize the data. The storage level 290 represents the capabilities of the storage environment for storing, retrieving, and managing the data. An application server 202a . . . 202n (FIG. 4) generated data file may be defined at these different levels in order to allocate specific storage resources to the data file.

Each level 250, 270, and 290 may include attributes, i.e., application attributes 252, data attributes 272, and storage attributes 292. These attributes 252, 272, and 282 may comprise industry defined attributes that represent properties and characteristics of each level of management, i.e., at an application level, data level, and storage level. The application attributes 252 are concerned with properties and characteristics related to the requirements demanded by the client application for data the application generates or uses, such as an application data request rate or I/O transaction rate, initial access delay, user response time, read/write ratio, etc.

The data attributes 272 concern the properties and characteristics related to data usage and retention requirements, including performance and availability of the data, such as initial access delay, sustained access rate, sequential or random access, availability criteria, life cycle management and recoverability. Life cycle attributes concern the length of time data must be maintained, the number of versions that are maintained, what actions should be taken when the time period has elapsed or a maximum number of versions is exceeded, such as archival, deletion, etc. Recoverability attributes indicate the number and location of backup copies of the data, the backup scheduling, etc. Certain of the data level attributes 272 may be either dynamic, that is they change over time, or intrinsic, which do not change. For instance, the performance requirements are a dynamic data attribute because they may change depending on the time of day, application usage, etc., whereas the expiration policies for a data file are intrinsic in that they do not change once configured for the data file. The data policies may also include security policies, including logical and physical security. Logical security is concerned with access lists, i.e., who can access the data, authorization levels, and what users can do with data. The security policies for data may be defined with attributes in order to control who has what access to data. Physical security concerns the location of a data storage resource, such as in a locked or guarded room.

Storage level attributes 292 are concerned with the properties and characteristics related to storage capabilities, such as capacity, bandwidth, I/O rates, reliability/error rates, number of paths from the storage server 208a . . . 208n (FIG. 4) to a storage resource 204a, 204b . . . 204n, physical location and security, lease duration, cost, server file system capabilities and limits. The storage attributes may be based on business reasons, e.g., lease expiration, environmental reasons, e.g., physical security, functional needs, e.g., reliability for specified time period.

Each level also may also include management functions 254, 274 and 294. The management functions 254, 274, and 294 define program mechanisms through which storage administration operations are performed. These are programs that run to properly allocate storage or route data to the physical storage resource 204a, 204b . . . 204n that will store the data. The management functions 254, 274, and 294 can be implemented in the software or hardware of storage resources 204a, 204b . . . 204n, and or by other elements coupled to the storage resources. The storage attributes may define such aspects as the number of storage devices, the RAID level, the use of backup or "snapshot" programs, garbage collection, cache management, etc. Also included are the management function which comprise programs that manage movement of the data through a storage hierarchy, maintain backup copies of the data, and recover the data in the event of data loss or damage.

Each level also includes policies, such as application policies 256, data policies 276, and storage policies 296. The polices 256, 276, and 296 map one or more of the attributes 252, 272, and 292, which as discussed are predefined, and may be defined according to an industry standard, to separate application containers 258a, 258b . . . 258n, data containers 278a, 278b . . . 278n, and storage containers 298a, 298b . . . 298n, respectively. Thus, each of the application 258a, 258b . . . 258n, data 278a, 278b . . . 278n, and storage 298a, 298b . . . 298n containers define a set of attributes 260a, 260b . . . 260n, 280a, 280b . . . 280n, 300a, 300b . . . 300n, respectively, that is a subset of the application 252, data 272, and storage 292 attributes.

Policies 252, 272, and 292 for the management of storage, and data residing on the storage, may be created to satisfy business objectives. These policies may be derived from business practices and guidelines that affect the use and storage of data. For instance, storage policies may be derived from business policies that specify how long data is to be maintained, time for payment of employees, and how often critical data, such as financial transactions, must be stored off-site. The first example defines a data policy that specifies the retention characteristics of data. The second example is an application policy determining how frequently the payroll application must run to generate payments for employees. The third example implies a data policy for remote copying of specific data. Thus, the attributes may refer to such aspects and requirements as reliability, performance, availability, and installability of the storage elements.

In certain implementations, the containers of the present invention may be implemented as object oriented classes. For instance, the containers may be implemented as Java classes with logical attributes as static variables. The management functions may be implemented as class methods that invoke actual management functions.

The policies 256, 276, and 296 also define for each of the application 258a, 258b . . . 258n, 278a, 278b . . . 278n, and storage 298a, 298b ... 298n containers a set of management functions 262a, 262b ... 262n, 282a, 282b ... 282n, 302a, 302b ... 302n that is a subset of the management functions 254, 274, and 294 available for the different levels. As each container defines a set of attributes, the management functions defined for that container define the functions that may be called to implement a storage environment and operations that will satisfy the attributes/requirements defined for that container. For instance, if one data container 258a, 258b ... 258n defines data attributes 260a, 260b ... 260n that specify the archival of files after a certain period of time, then the management functions 262a, 262b ... 262n defined for that container would comprise the program calls to perform the archival of files as specified by the attributes for that container.

The container construct maps a specific combination of logical attributes to a set of specific data and storage element, where an element is any hardware or software product or component that provides some form of data or storage placement, access or management function. A storage resource 204a, 204b ... 204n comprises one or more such elements. For instance, one container can define a specific availability level, performance range, and security classification. Management functions defined for the container may perform operations related to creation, migration, and extension of logical disks, and copy services. The container may be implemented with specific storage hardware and software that matches the attributes defined for the container.

The schema of FIG. 5 also provides policy managers, such as an application policy manager 264, a data policy manager 284, and a storage system policy manager 304. The policy managers 264, 284, 304 utilize the mappings specified in the policies 256, 276, and 296, respectively, to associate attributes and management functions with containers. The policy managers 264, 284, and 304 further associate a container determined at a previous level with a container at the current level. For instance, the application policy manager 264 associates data characteristics with one application containers 258a, 258b ... 258n. The data policy manager 284 would receive the selected application container 258a, 258b ... 258n, having defined attributes and management functions, and associate the selected application container 258a, 258b ... 258n and any data characteristics with one or more data containers 278a, 278b ... 278n. Likewise, the storage system policy manager 304 associates the data container 278a, 278b ... 278n, selected at the previous level, and any data characteristics with one storage container 298a, 298b ... 298n. After the storage container 298a, 298b ... 298n is determined for a data file, the storage system policy manager 304 then associates the selected storage container 298a, 298b ... 298n to one of the storage resources 204a, 204b ... 204n, where each storage resource 204a, 204b ... 204n comprises a combination of storage hardware and software to implement a storage space capable of satisfying the logical storage 300a, 300b ... 300n attributes and management functions 302a, 302b ... 302n defined in the storage container 298a, 298b ... 298n.

In this way the policy managers 264, 284, and 304 at each level map the attributes/requirements at a given level into a predetermined container format readable by the next level. For instance, the data policy manager 284 associates capabilities defined by the application attributes 260a, 260b ... 260n specified for the application containers 258a, 258b ... 258n with data containers 278a, 278b ... 278n that provide management functions 282a, 282b ... 282n capable of implementing the requirements specified by the application attributes 260a, 260b ... 260n in the associated application container 258a, 258b ... 258n and the data attributes 280a, 280b ... 280n defined for the data container 278a, 278b ... 278n. Likewise, the storage policy manager 304 associates capabilities defined by the data attributes 280a, 280b ... 280n specified for the data containers 278a, 278b ... 278n with storage containers 298a, 298b ... 298n that provide management functions 302a, 302b ... 302n capable of implementing the requirements specified by the data attributes 280a, 280b ... 280n in the associated data container 278a, 278b ... 278n and any storage attributes 300a, 300b ... 300n defined for the storage container 298a, 298b ... 298n. The policy managers 264, 284, and 304 in addition to considering the container attributes from a previous level when mapping to the container at the current level may or may not also consider any other characteristics of the data file, and/or the attributes at the current level associated with the determined characteristics, to associate containers with the containers or resources at the current level.

The storage policy manager 304 associates capabilities defined by the storage attributes 300a, 300b ... 300n in the storage containers 298a, 298b ... 298n to specific storage resources 204a, 204b ... 204n capable of implementing the requirements defined by the storage attributes. In certain implementations, the resources 204a, 204b ... 204n may comprise storage systems from storage vendors. The storage vendors may include hardware manufacturers providing a specific hardware device and software to operate the device. Additionally, the storage vendors may include system integrators that integrate a collection of storage systems and software programs from different manufacturers and vendors to provide an open system storage system, including hierarchical storage management software, backup applications, archival programs, etc.

The storage vendor of each storage resource 204a, 204b ... 204n would specify storage attributes 306a, 306b ... 306n, respectively, that define the capabilities of the storage resource 204a, 204b ... 204n they are providing. The storage system policy manager 304 maps the storage containers 298a, 298b ... 298n to storage resources 204a, 204b ... 204n whose vendor defined storage attributes 306a, 306b ... 306n are capable of satisfying the logical storage attributes 300a, 300b ... 300n required by the storage containers 298a, 298b ... 298n. In this way, the storage vendors specify logical storage attributes 306a, 306b ... 306n applicable to their storage resource 204a, 204b ... 204n, which may comprise storage attributes defined according to industry wide standards, such as the storage attributes 292. The storage system policy manager 304 would query the storage attributes 306a, 306b ... 306n defined by the storage vendor to select a storage resource 204a, 204b ... 204n that can satisfy the attributes/requirements 300a, 300b ... 300n specified in the storage containers 298a, 298b ... 298n. Alternatively, the vendor storage attributes 306a, 306b ... 306n may be different than the storage attributes 300a, 300b ... 300n defined for the containers 298a, 298b ... 298n and, in such implementations, the storage system policy manager 304 would map vendor storage attributes 306a, 306b ... 306n to the attributes 292 used in the storage level 290. In this way, any storage vendor storage system may be integrated into a storage environment because the policy based storage manager 210a, 210b ... 210n (FIG. 4) would be able to utilize the storage system for data files based on the storage attributes the storage vendor specifies for the storage.

Further, application vendors may develop and distribute application policies 256 and application policy managers 264 for their applications to map application attributes to specific application containers that then may be used at another level to provide further mapping. Middleware vendors that develop middleware on which the applications run may develop and distribute data policies 276 and data policy managers 284 to map application attributes and containers as well as other data characteristics to data containers 278a, 278b . . . 278n, which are then passed to the storage system policy managers 304. In this way, different vendors and parties may separately provide the components at each level that will be used to categorize and define the data to eventually select a storage resource that satisfies the attributes/requirements specified by each component that uses the data, from the application, to middleware to the storage. Middleware comprises the program component that interfaces between the operating system and the application, and may be used to allow an application to run on different operating systems by providing an interface between the application and operating system. Alternatively, the data level may be defined by the application or some other non-middleware component.

The policy based storage manager 210a . . . 210n (FIG. 4) may provide a graphical user interface (GUI) tool to allow system administrators to define the policies 256, 276, and 296 (FIG. 5) to associate the attributes 252, 272, and 292 and management functions 254, 274, and 294 with specific application 258a, 258b . . . 258n, data 278a, 278b . . . 278n, and storage 298a, 298b . . . 298n containers, respectively. This GUI tool would also allow the system administrator to define the application policies 256 to associate application containers and certain data characteristics (that may map to data attributes) with storage containers; to define the data policies 284 to associate data containers and certain data characteristics (that may map to storage attributes) with storage containers; and the storage policies 304 to associate storage containers 298a, 298b . . . 298n and certain data characteristics with storage resources 204a, 204b . . . 204n based on the attributes the storage vendors provide for the storage resources. Alternatively, the storage system policy manager 304 may comprise a program that automatically selects a storage resource 204a, 204b . . . 204n having storage vendor defined characteristics/attributes that are capable of satisfying the storage attributes 300a, 300b . . . 300n defined for the storage container 298a, 298b . . . 298n. The storage system policy manager 296 may map each storage container 298a, 298b . . . 298n to one or more storage resources 204a, 204b . . . 204n if the storage vendor defined attributes for multiple storage resources 204a, 204b . . . 204n are capable of satisfying the storage attributes 300a, 300b . . . 300n for the storage containers 298a, 298b . . . 298n and any further considered data characteristics.

An administrator using the GUI tool of the policy based storage manager 210a . . . 210n (FIG. 4) can configure the schema shown in FIG. 5, or a particular level of the schema, or the schema can be preconfigured. The schema may be executed by the policy based storage manager 210a . . . 210n when deciding how to route data files received from client applications to storage resources 204a, 204b . . . 204n. The schema shown in FIG. 5 may be implemented in a database system, in data structures and functions defined in an object oriented programming system, in an Extensible Markup Language (XML), etc. For instance, each container may be defined as an XML element and the attributes and management functions defined for the container may comprise XML attributes of the container element. Further the schema shown in FIG. 5 may be implemented within the Distributed Management Task Force (DMTF) Common Information Model (CIM), which uses a uniform object oriented modeling formalism that allows for an object-oriented schema across multiple organizations.

Moreover, the components at the different levels 250, 270, and 290 may run on different machines. For instance, the storage level 290 components may run on storage servers 208a . . . 208n and the application 250 and data 270 levels may run on the application server 202a . . . 202n. Alternatively, the components for one or more levels 250, 270, and 290 may run on a single machine, such as a storage server.

Figure 6A:
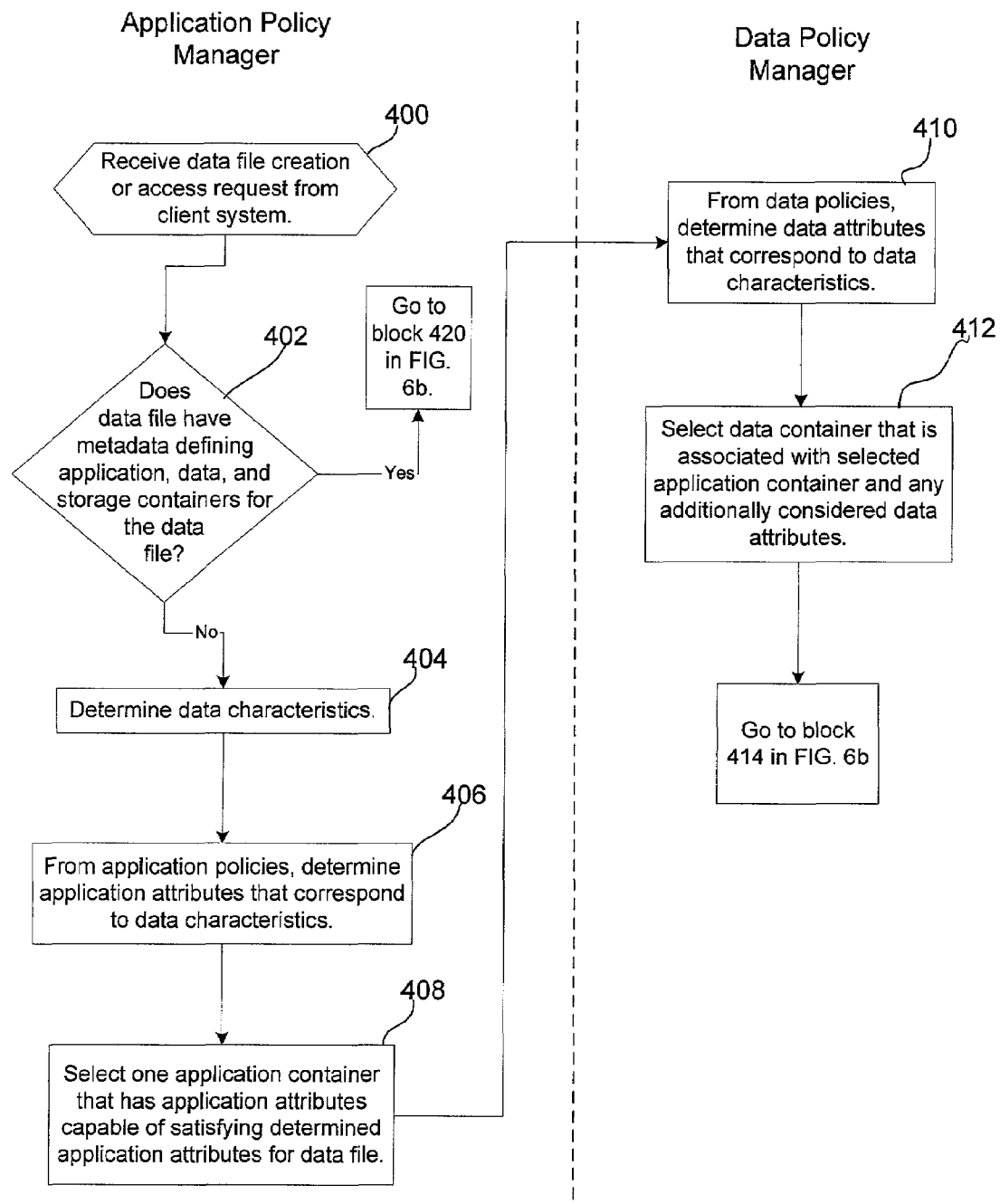

FIGS. 6a and 6b illustrate operations performed by the policy managers 264, 284, and 304 in accordance with implementations of the invention to assign a storage resource 204a, 204b . . . 204n to a data file. Control begins at block 400 upon the application policy manager 264 receiving a request to create or access a data file from an application server 202a . . . 202n system. The application policy manager 264 performs steps 400 through 408. If (at block 402) the data file does not have associated metadata indicating application 258a, 258b . . . 258n, data 278a, 278b . . . 278n, and storage 298a, 298b . . . 298n containers for the data file, then the application policy manager 264 determines (at block 404) the data characteristics, such as file name, time file generated, source application, user, data management requirements, business policies, etc., that may map to application 252, data 272, and storage 292 attributes From the application policies 256 (FIG. 5), the application policy manager 264 determines (at block 406) the application attributes that correspond to the determined data characteristics gleaned form the data file. One application container 258a, 258b . . . 258n is selected (at block 408) having application attributes 260a, 260b . . . 260n that correspond to the application attributes determined from the data file characteristics.

After selecting an application container 258a, 258b . . . 258n, control proceeds to the data level 270 (FIG. 5) where the data policy manager 284 determines (at block 410), from the data policies 276 the data attributes corresponding to the determined data characteristics. The data policy manager 284 then selects (at block 412) a data container 278a, 278b . . . 278n that the data policies 276 define to be associated with the selected application container 258a, 258b . . . 258n and any additional determined data characteristics that map to data attributes (additional data attributes may or may not be considered in selecting one data container 278a, 278b . . . 278n that satisfies the requirements of the application attributes 260a, 260b . . . 260n defined for the selected application container 258a, 258b . . . 258n).

After selecting a data container 278a, 278b . . . 278n, control proceeds to block 414 in FIG. 6b, where the storage system policy manager 304 uses the storage policies 296 to determine (at block 414) the storage attributes corresponding to the determined data characteristics. The storage system policy manager 304 performs the steps 414 through 424 in FIG. 6b. The storage system policy manager 304 selects (at block 416) a storage container 298a, 298b . . . 298n that the storage policies 296 define as associated with the selected data container 278a, 278b . . . 278n and any additional determined storage attributes (additional storage attributes may or may not be considered in selecting one storage container 298a, 298b . . . 298n that satisfies the requirements of the data attributes 280a, 280b . . . 280n defined for the selected data container 278a, 278b . . . 278n as well as any possible additional storage attributes determined from the data characteristics).

The storage system policy manager 304 stores (at block 418) information on the selected application, data and storage containers with metadata for the data file. From block 418 or the yes branch of block 402 (if the metadata is already defined for the data file), control proceeds to block 420 where the storage system policy manager 304 determines (at block 420) from the storage system policy manager 304 the storage resource 204a, 204b . . . 204n that is associated with the selected storage container 298a, 298b . . . 298n indicated in the data file metadata. In further implementations, even if metadata is defined for the data file, a determination may be made of the application, data, and storage containers for the data file because if certain of the attributes are dynamic and have changed, then the containers corresponding to the attributes/requirements for that data file may also have changed.

The storage resource 204a, 204b . . . 204n to which the data is transmitted will implement and execute the management functions (at block 424) defined in the application, data and storage containers indicated in the metadata to perform operations to implement the attributes associated with the data. For instance, if the data attributes identify certain life cycle attributes for that data, then the appropriate archival or storage management program is called to perform the specified action at expiration time, deletion, archival, migration to a less expensive, slower storage, i.e., hierarchical storage management, etc. In this way, the attributes corresponding to the data file are implemented by the execution of the management functions indicated in the containers identified for the data file as well as selection of one storage resource 204a, 204b . . . 204n to store the data file. The management functions may comprise any application program related to the management of data in a storage system. Moreover, vendors may provide different configurations of their storage resources, or a same product, to associate with different storage containers to allow their storage resources to be used to satisfy different application, data and storage policies associated with the data.

The above described policy based storage management framework may be used to associate data having certain determined data characteristics with certain levels of attributes that define requirements for that data. Each higher level of attributes may be used to determine the container selected at a lower level. The lowest level container, which in certain implementations comprises the storage level container, is then used to select a storage resource 204a, 204b . . . 204n that will be used to satisfy attributes and requirements defined for the data file based on the data characteristics.

In further implementations, the application level may define service level agreement attributes that are used to select the appropriate data and storage containers through the application 264 and data 284 connectors capable of implementing the service level objectives specified in the service level agreement relevant to the data file.

FIG. 7 illustrates one implementation of a container 600 data structure comprising application container 610, data container 620 and storage container 630 components. The container 600 data structure provides a common data structure to enable attributes and management functions to be transmitted between application level elements, data level elements and storage level elements. Each of the container components 610, 620 and 630 is in turn comprised of a plurality of attribute value fields 612a . . . 612n, 622a . . . 622n and 632a . . . 632n, as well as management function identification fields 614a . . . 614n, 624a . . . 624n and 634a . . . 634n. In another embodiment the common container data structure may comprise a subset of the component containers 610, 620 and 630 wherein the attribute values and management function identifiers are transformed by one or more of the application, data and storage levels to implement requirements based on the container content and or add to or modify the content of one or more of the container fields based on a policy operating at that level. In such an embodiment a control field may be used to provide additional information regarding the applicability of the fields at the application, data or storage level. In a further embodiment attribute fields and or management function fields can be combined into service level fields.

Additional Implementation Details

The policy based storage manager described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

FIG. 5 illustrates three levels of classes of attributes and containers that may be associated with a received data file. In alternative implementations, there may be fewer than the three shown levels, e.g., just a data level and storage level, and additional levels for different classes of attributes.

In FIGS. 1, 2, 3, 5, and 7 a specific data structure and architectures were described for implementing policy based managed storage. In alternative implementations, alternative data structure arrangements may be used, and additional information may be provided in the data structures providing information on the attributes at each of the considered levels, e.g., application, data, storage, etc.

The illustrated logic of FIGS. 6a and 6b indicates certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 8:
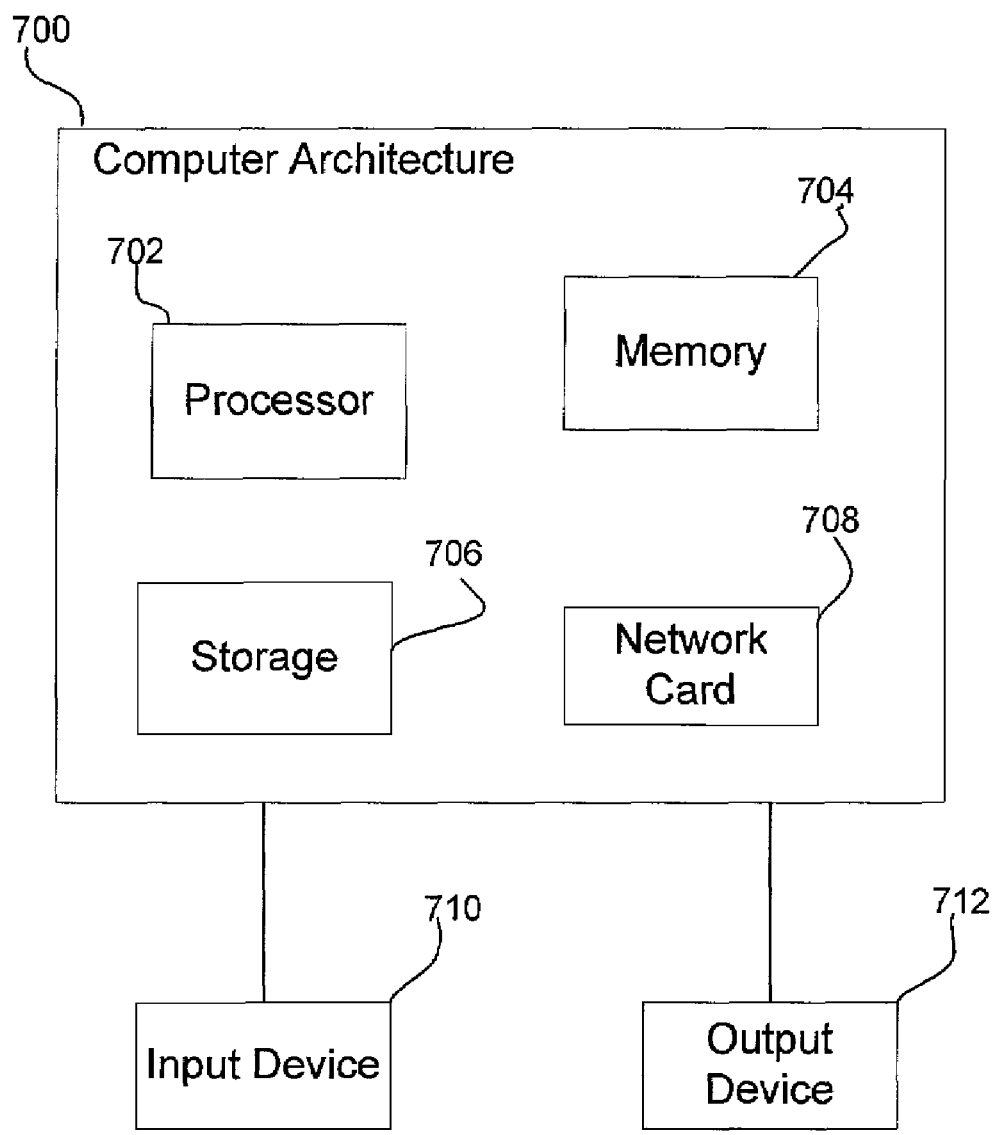
FIG. 8 illustrates a computing architecture that may be utilized with certain implementations of the invention.

FIG. 8 illustrates one implementation of the architecture of the computer system 202. The system 202 may implement a computer architecture 700 having a processor 702 (e.g., a microprocessor), a memory 704 (e.g., a volatile memory device), and storage 706 (e.g., a non-volatile storage, such as magnetic disk drives, optical disk drives, a tape drive, etc.). The storage 706 may comprise an internal storage device or an attached or network accessible storage. Programs in the storage 706 are loaded into the memory 704 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for generating containers for use in storing data, comprising:
    defining a plurality of containers in a computer readable medium, wherein a first level of containers indicates first level attributes providing capabilities for a computational resource and a second level of storage containers indicates a plurality of storage attributes providing storage capabilities of a storage resource and storage management capabilities in addition to the storage capabilities of the storage resource and at least one function to manage the storage resource to store data according to the provided storage resource and storage management capabilities indicated in the storage attributes;
    defining first level policies in the computer readable medium that map data attributes of the data to the first level containers;
    defining storage policies in the computer readable medium that associate data attributes of data concerned with management of the data to storage containers by enabling operations to be performed, the operations comprising:
        determining storage attributes corresponding to data attributes of the data;
        determining one of the storage containers using information on the determined storage attributes and the first level container to which the data attributes of the data map, wherein each defined storage container is adapted to provide requirements to determine a storage resource to store the data having the data attributes, and wherein the defined storage container is adapted to provide the storage resource with at least one function for storing the data; and
        using the at least one function indicated by the determined storage container to store the data in a manner that satisfies the storage attributes defined by the determined storage container.

2. The method of claim 1, wherein the first level containers comprise application containers and wherein the first level policies comprise application policies concerning application requirements with respect to data, further comprising:
    defining an application policy manager in the computer readable medium that processes application containers to determine the application container having application attributes corresponding to the determined data attributes.

3. The method of claim 2, wherein the application policies further comprise enterprise specific attributes for data associated with an application level element.

4. The method of claim 1, further comprising:
    data policies including criteria for management of the data life cycle, recoverability, and security; and
    generating a data policy manager that processes data containers to determine the data container having data attributes corresponding to determined characteristics of the associated data.

5. The method of claim 4, wherein the data policies are adapted to operate as middleware.

6. The method of claim 1, wherein storage vendors provide storage policies, storage policy managers, and the storage containers to associate storage policies with their storage resources.

7. The method of claim 1, wherein the storage policy manager determines the storage resource associated with the determined storage container and transmits the data to the determined storage resource.

8. The method of claim 1, wherein the storage management capabilities include hierarchical data storage management capabilities and wherein the at least one function implementing the storage management capabilities comprises software.

9. A computer readable medium including:
    a first level of containers indicating first level attributes providing capabilities for a computational resource;
    a second level of storage containers indicating a plurality of storage attributes providing storage capabilities of a storage resource and storage management capabilities in addition to the storage capabilities of the storage resource and at least one function to manage the storage resource to store data according to the provided storage resource and storage management capabilities indicated in the storage attributes, wherein each defined storage container is adapted to provide requirements to determine a storage resource to store data having the data attributes, and herein the defined storage container is adapted to provide the storage resource with at least one function for storing the data;
    first level policies that map data attributes of the data to the first level containers;
    storage policies enabled to associate data attributes of the data concerned with the management of the data to storage containers by enabling operation to be performed, the operation comprising:
        determining storage attributes corresponding to data attributes of the data;
        determining one of the storage containers using information on the determined storage attributes and the first level container to which the data attributes of the data map; and
        using the at least one function indicated by the determined storage container to store the data in a manner that satisfies the storage attributes defined by the determined storage container.

10. The computer readable medium of claim 9, wherein the first level policies comprise application policies concerning application requirements with respect to data, wherein an application policy manager processes application containers to determine the application containers having attributes corresponding to the determined data attributes.

11. The computer readable medium of claim 10, wherein different application vendors provide application policies and storage containers to associate storage policies with data generated by their applications.

12. The computer readable medium of claim 9, further comprising data policies including criteria for management of the data life cycle, recoverability, and security, and wherein a data policy manager processes the data containers to determine the data container having data attributes corresponding to determined characteristics of the data.

13. The computer readable medium of claim 12, wherein middleware vendors provide data policies, data policy managers, and storage policies to associate storage policies with data generated by their middleware.

14. The computer readable medium of claim 9, wherein storage vendors provide storage policies, storage policy managers, and the storage containers to associate storage policies with their storage resources.

15. The computer readable medium of claim 9, wherein the storage management capabilities include hierarchical data storage management capabilities and wherein the at least one function implementing the storage management capabilities comprises software.

16. A method of processing data to be stored, comprising:
associating an application attribute with data characteristics of data based on an application policy, wherein the application attribute provides application capabilities concerned with properties and characteristics related to requirements demanded by a client application for data the client application generates or uses;
determining an application attribute in a predetermined application container that corresponds to the data characteristics of the data, wherein the predetermined application container is adapted to be received by a data level policy manager and by a storage level policy manager to provide the storage resource with functions for storing the data having the data characteristics according to the provided application capabilities indicated in the application attribute; and
using the functions indicated by the predetermined application container to store the data in a manner that satisfies the application attribute defined by the predetermined application container.

17. An article of manufacture comprising at least one of logic implemented in a hardware device and code stored in a computer readable storage medium, wherein the at least one of the logic and code when executed cause article of manufacture causes operations to be performed, the operations comprising:
associating an application attribute with data characteristics of data based on an application policy, wherein the application attribute provides application capabilities concerned with properties and characteristics related to requirements demanded by a client application for data the client application generates or uses;
determining an application attribute in a predetermined application container that corresponds to the data characteristics of the data, wherein the predetermined application container is adapted to be received by a data level policy manager and by a storage level policy manager and to provide the storage resource with functions for storing the data having the data characteristics according to the provided application capabilities indicated in the application attribute; and
using the functions indicated by the predetermined application container to store the data in a manner that satisfies the application attribute defined by the predetermined application container.

18. A computer implemented method for storing data, comprising:
determining attributes corresponding to data characteristics of the data;
processing a plurality of first level containers in a computer readable medium to determine one first level container having first level attributes corresponding to the determined characteristics of the data;
processing a plurality of second level containers in the computer readable medium to determine one second level container using information on the second level attributes corresponding to the determined characteristics of the data and the determined first level container, wherein each second level container indicates a plurality of second level attributes and at least one function, wherein the second level attributes include capabilities in addition to storage capabilities of a storage resource to store the data, wherein the storage resource is associated with the determined second level container; and
using the at least one function indicated by the determined second level container to store the data in the storage resource in a manner that satisfies the attributes indicated by the determined second level container, including second level attributes providing capabilities in addition to the storage capabilities of the storage resource.

19. The method of claim 18, wherein the first level containers comprise application containers and wherein the first level attributes comprise application attributes, wherein an application policy maps the application attributes and at least one function to the application containers, wherein the application policy concerns an application requirements with respect to data, and wherein an application policy manager processes the application containers to determine the application container having application attributes corresponding to the determined characteristics of the data.

20. The method of claim 19, wherein different application vendors provide application policies and application policy managers to associate application policies with data generated by their applications.

21. The method of claim 18, wherein the first level containers comprise data containers and wherein the first level attributes comprise data attributes, wherein a data policy maps the data attributes and at least one function to the data containers, wherein the data policy concerns criteria for management of the data life cycle, recoverability, and security, and wherein a data policy manager processes the data containers to determine the data containers having data attributes corresponding to the determined characteristics of the data.

22. The method of claim 21, wherein middleware vendors provide data policies and data policy managers to associate storage policies with data generated by their middleware.

23. The method of claim 18, wherein the second level containers comprise storage containers and wherein the second level attributes comprise storage attributes, wherein a storage policy maps the storage attributes and at least one function to the storage containers, wherein the storage policy concerns management and configuration of a storage space for data, and wherein a storage policy manager processes the storage containers to determine the storage containers having storage attributes corresponding to the determined characteristics of the data.

24. The method of claim 23, wherein storage vendors provide storage policies and storage policy managers to associate storage policies with their storage resources.

25. The method of claim 23, wherein the storage policy manager determines the storage resource associated with the determined storage container and transmits the data to the determined storage resource.

26. The method of claim 18, wherein the at least one function is executed by programs in the determined storage resource.

27. The method of claim 18, wherein the determined data characteristics concern properties of a file including the data and characteristics of an application creating the data.

28. The method of claim 18, wherein the first level containers comprise data containers, wherein the first level attributes in the data containers comprise data attributes concerning properties related to data usage and retention requirements, and wherein the functions indicated in the data containers indicate data management operations to implement the data attributes indicated in the data containers.

29. The method of claim 28, wherein the data attributes include at least one member of a set of data attributes comprising: performance and availability of the data, life cycle management and recoverability.

30. The method of claim 28, wherein the second level containers comprise storage containers and the second level attributes in the storage containers comprise storage attributes concerning properties related to storage capabilities, and wherein the functions indicated in the storage containers indicate storage management operations to implement the storage attributes indicated in the storage containers.

31. The method of claim 30, wherein the storage attributes include at least one member of a set of storage attributes comprising: storage capacity, bandwidth, Input/Output (I/O) rates, reliability/error rates, number of paths to storage resource, physical location, and security.

32. The method of claim 18, wherein the second level containers comprise storage containers and the second level attributes in the storage containers comprise storage attributes concerning properties related to storage capabilities, and wherein the determined storage resource associated with the determined storage container satisfies the storage attributes indicated in the determined storage container.

33. The method of claim 32, wherein there are a plurality of storage resources, wherein storage vendor attributes are provided with each storage resource, and wherein determining one storage resource associated with the determined storage container further comprises:
  determining the storage resource having storage vendor attributes that satisfy the storage attributes indicated in the determined storage container.

34. The method of claim 33, wherein the storage resources are provided from different storage vendors.

35. The method of claim 18, wherein processing the containers further comprises:
  determining one third level container corresponding to the determined first level container, wherein the determined second level container corresponds to the determined third level container.

36. The method of claim 35, wherein the first level attributes in the first level containers comprise application attributes related to application usage of the data, wherein third level attributes in the third level containers comprise data attributes concerning properties related to data usage and retention requirements.

37. A system for storing data, comprising:
  means for determining attributes corresponding to data characteristics of the data;
  a computer readable medium including first level containers having first level attributes corresponding to the determined data characteristics and second level containers having second level, attributes and at least one function, wherein the second level attributes include capabilities in addition to storage capabilities of a storage resource to store the data;
  means for processing a plurality of first level containers to determine one first level container having first level attributes and at least one function corresponding to the determined characteristics of the data;
  means for processing the second level containers to determine one second level container using information on the second level attributes corresponding to the determined characteristics of the data and the determined first level container, wherein the storage resource is associated with the determined second level container, and wherein the storage resource associated with the determined second level container implements the second level attributes and the at least one function indicated in the second level container; and
  means for using the at least one function indicated by the determined second level container to store the data in the storage resource in a manner that satisfies the second level attributes indicated by the determined second level container, including attributes providing capabilities in addition to the storage capabilities of the storage resource.

38. The system of claim 37, wherein the first level containers comprise application containers and wherein the first level attributes comprise application attributes, further comprising an application policy that maps the application attributes and at least one function to the application containers, wherein the application policy concerns application requirements with respect to data, and wherein an application policy manager processes the application containers to determine the application container having attributes corresponding to the determined characteristics of the data.

39. The system of claim 37, wherein the first level containers comprise data containers and wherein the first level attributes comprise data attributes, further comprising a data policy that maps the data attributes and at least one function to the data containers, wherein the data policy concerns criteria for management of the data life cycle, recoverability, and security, and wherein a data policy manager processes the data containers to determine the data container having attributes corresponding to the determined characteristics of the data.

40. The system of claim 37, wherein the second level containers comprise storage containers and wherein the second level attributes comprise storage attributes, further comprising a storage policy that maps the storage attributes and at least one function to the storage containers, wherein the storage policy concerns management and configuration of a storage space for data, and wherein a storage policy manager processes the storage containers to determine the storage container having attributes corresponding to the determined characteristics of the data.

41. The system of claim 39, wherein the means for processing the containers further performs:
  determining one of a plurality of third level containers corresponding to the determined first level container, wherein the determined second level container corresponds to the determined third level container.

42. An article of manufacture comprising at least one of logic implemented in a hardware device and code stored in a computer readable storage medium, wherein the at least one of the logic and code when executed communicate with a computer readable medium and cause operations, the operations comprising:
  determining attributes corresponding to data characteristics of the data;
  processing a plurality of first level containers in the computer readable medium to determine one first level container having first level attributes corresponding to the determined characteristics of the data;
  processing a plurality of second level containers to determine one second level container using information on the second level attributes corresponding to the determined characteristics of the data and the determined first level container, wherein each second level container indicates a plurality of second level attributes and at least one function, wherein the second level attributes include capabilities in addition to storage capabilities of a storage resource to store the data, wherein the storage resource is associated with the determined second level container; and
  using the at least one function indicated by the determined second level container to store the data in the storage resource in a manner that satisfies the second level attributes indicated by the determined second level container, including second level attributes providing capabilities in addition to the storage capabilities of the storage resource.

43. The article of manufacture of claim 42, wherein the first level containers comprise application containers and wherein the first level attributes comprise application attributes, wherein an application policy maps the application attributes and at least one function data to the application containers, wherein the application policy concerns application requirements with respect to data, and wherein an application policy manager processes the application containers to determine the application container having application attributes corresponding to the determined characteristics of the data.

44. The article of manufacture of claim 42, wherein the first level containers comprise data containers and wherein the first level attributes comprise data attributes, wherein a data policy maps the data attributes and at least one function to the data containers, wherein the data policy concerns criteria for management of the data life cycle, recoverability, and security, and wherein a data policy manager processes the data containers to determine the data container having data attributes corresponding to the determined characteristics of the data.

45. The article of manufacture of claim 42, wherein the second level containers comprise storage containers and wherein the first level attributes comprise storage attributes, wherein a storage policy maps the storage attributes and at least one function to the storage containers, wherein the storage policy concerns management and configuration of a storage space for data, and wherein a storage policy manager processes the storage containers to determine the storage container having storage attributes corresponding to the determine characteristics of the data.

46. The article of manufacture of claim 45, wherein the first level containers comprise data containers and the first level attributes comprise data attributes concerning properties related to data usage and retention requirements, and wherein the functions indicated in the data containers indicate data management operations to implement the data attributes indicated in the data containers.

47. The article of manufacture of claim 42, wherein processing the containers further comprises:
  determining one third level container corresponding to the determined first level container.

* * * * *